United States Patent [19]
Walter

[11] Patent Number: 5,967,277
[45] Date of Patent: *Oct. 19, 1999

[54] PAWL CLUTCH

[75] Inventor: Christopher J. Walter, Portland, Oreg.

[73] Assignee: Warn Industries, Inc., Milwaukie, Oreg.

[*] Notice: This patent is subject to a terminal disclaimer.

[21] Appl. No.: 09/016,533

[22] Filed: Jan. 30, 1998

Related U.S. Application Data

[63] Continuation-in-part of application No. 08/897,355, Jul. 21, 1997.

[51] Int. Cl.$^6$ .............................. F16D 41/16; F16D 41/02
[52] U.S. Cl. ................. 192/43.1; 192/35; 192/46
[58] Field of Search .................... 192/43.1, 45.1, 192/46, 47, 71, 35, 36

[56] References Cited

U.S. PATENT DOCUMENTS

| | | |
|---|---|---|
| 547,386 | 10/1895 | Stewart . |
| 1,615,534 | 1/1927 | Cassel . |
| 1,883,966 | 10/1932 | Krause . |
| 2,181,244 | 11/1939 | McGrew . |
| 2,226,247 | 12/1940 | Lesage . |
| 2,708,990 | 5/1955 | Cudosky . |
| 2,818,950 | 1/1958 | Harless . |
| 2,976,959 | 3/1961 | Husted . |
| 3,055,471 | 9/1962 | Warn et al. ........................... 192/35 X |
| 3,314,510 | 4/1967 | Zlotek . |
| 3,463,279 | 8/1969 | Breisch et al. . |
| 3,511,348 | 5/1970 | Jonsson et al. . |
| 3,623,582 | 11/1971 | Giger . |
| 3,651,907 | 3/1972 | Myer, Sr. . |
| 3,838,567 | 10/1974 | Giger et al. . |
| 4,049,099 | 9/1977 | Zeigler . |
| 4,076,108 | 2/1978 | Fogelberg ................................ 192/35 |
| 4,222,473 | 9/1980 | Kopich . |
| 4,254,852 | 3/1981 | Orozco . |
| 4,363,390 | 12/1982 | Eisend et al. . |
| 4,437,553 | 3/1984 | Geisthoff . |
| 5,070,978 | 12/1991 | Pires . |
| 5,170,870 | 12/1992 | Kampf . |
| 5,449,057 | 9/1995 | Frank . |
| 5,597,057 | 1/1997 | Ruth et al. . |

*Primary Examiner*—Richard M. Lorence
*Attorney, Agent, or Firm*—Robert L. Harrington

[57] ABSTRACT

A clutch mechanism for a vehicle drive train wherein a drive member and driven member are inter-engaged by pawls. In the preferred embodiment the driven member surrounds the drive member in concentric relationship and provides facing surfaces that are configured to receive pairs of pawls or pawl portions selectively extended from the drive member surface to the driven member surface. A control member is mounted on the drive member with limited rotation relative to the rotation of the drive member. The control member includes a cam slot and the pawls are provided with laterally extended cam follower tabs that extend into the cam slots. The control member is provided with a rotationally retarding means whereby whichever direction the drive member rotates, the control member is shifted to the trailing position within the range of permitted rotation. The pawl pairs carried by the drive member are thus positioned at differing positions relative to the cam slots and the cam slots dictate which pawls are projected into engagement with the driven member.

11 Claims, 8 Drawing Sheets

PAWL CLUTCH

This invention is a continuation-in-part of U.S. Ser. No. 08/897,355, filed Jul. 21, 1997.

FIELD OF THE INVENTION

This invention relates to a clutch mechanism for automatic engagement between rotating members in either direction of rotation.

BACKGROUND OF THE INVENTION

This invention is primarily applicable to the drive trains of vehicles wherein drive power is provided for both front and rear wheels. More particularly, it is applicable to vehicles that have one set of wheels permanently engaged and the other set of wheels engaged as needed, in either direction of travel.

A vehicle may have the rear wheels permanently engaged and under favorable driving conditions the front wheels are not engaged. Should the rear wheels start to slip, e.g., when driving on ice or snow or when trying to get unstuck from a stuck condition, the front wheels automatically engage.

Such engagement is provided by a clutch mechanism interposed between a component of the vehicles drive train connected to the permanently driven wheels (drive component) and a component of the drive train connected to the normally passive wheels (driven component). When slipping starts to occur, the rear wheels rotate faster than the front (passive) wheels and this translates into the drive component rotating faster than the driven component.

The clutch mechanism of the invention reacts to such overrunning rotation of the drive component and causes the clutch mechanism to inter-engage the drive and driven components thus imparting drive power to the normally passive wheels.

A known clutch mechanism designed for this purpose is disclosed in U.S. Pat. No. 5,195,604. Rollers retained in a cage are interposed between a drive ring and a driven ring mounted in concentric relation. The annular spacing between the two rings (in which the rollers reside) is configured so that the radial distance between the rings varies between positions where the spacing between the ring is greater than the diameter of the rollers and where the distance is smaller than the diameter of the rollers. When overrunning occurs, the rollers move to the positions of smaller spacing and become wedged between the rings and thereby interlock the two rings. This occurs in either forward or reverse direction.

Roller clutches have some disadvantages, however. The wedgetype of interlocking generates radial stresses that require relatively massive drive and driven rings. This adds weight and takes up room in areas where such characteristics are undesirable. The present invention is directed to the replacement of the roller clutch mechanism with a pawl clutch mechanism. The use of a pawl clutch mechanism for the purposes described above is disclosed in U.S. Pat. No. 4,222,473. The pawl clutch mechanism of the '473 patent does not automatically (inherently) shift between front and reverse drive and requires the positive shifting (manual activation) of a phasing ring, e.g., via a solenoid. An even earlier patent (U.S. Pat. No. 2,181,244) discloses a pawl clutch mechanism as applied to locomotives. A complex and massive mechanism includes forward and rearward directed pawls mounted on trunnions and connected to forward and rearward drag members via trunnion arms. The pawls are pivoted by the resistive action of drag members, one set of pawls is pivoted into engagement and another set out of engagement depending on the direction of rotation.

It is an objective of the present invention to provide inherent shifting of a pawl type clutch mechanism in either direction of rotation produced by a more simple and efficient design (as compared to the prior mechanisms) and to provide this design in a compact package as required for vehicle application.

BRIEF DESCRIPTION OF THE INVENTION

The preferred embodiment of the present invention includes an inner drive ring (a drive component) and an outer driven ring (a driven component). Each ring is configured to have mated shoulders adapted for engagement by a first set of pawls when the rings are driven in a forward direction, and for engagement by a second set of pawls when the rings are driven in a reverse or rearward direction. A spring urges each pawl into engagement. The pawls have axially extended cam follower tabs that are projected into configured cam slots of a control ring. The control ring surrounds a fixed bearing surface and spring biased drag or brake shoes permit but resist rotation of the control ring. With the rings rotated in one direction, (e.g., to drive the vehicle in a forward direction), the control ring resists rotation until the cam follower tabs of the pawls are located at one rotative position of the cam slot. In this position, one set of pawl portions is cammed in opposition to the urging of the spring and centrifugal force to a disengaged position, and the other set of pawls is spring biased (aided by centrifugal force) into an engaged position. When the direction of the vehicle is reversed, i.e., with the drive and driven rings being rotated in the opposite direction, the control ring resists rotation until the pawls are positioned at the opposite side of the cam slot. In this position the pawl positions are reversed.

It will be apparent that the objective of the drag shoes is to provide the control ring with resistance to the rotation induced by the drive ring. This is most readily accomplished by frictional engagement with a fixed bearing surface. However, frictional engagement with a bearing surface that simply rotates more slowly than the drive and driven rings would also suffice and is encompassed by the fixed bearing surface reference. Such braking is alternatively referenced herein as having frictional engagement to ground, ground engagement meaning any frictional engagement that urges the control ring to a trailing position. It is further contemplated, however, that other forms of rotational retarding features may be provided to retard rotation of the control ring or member.

The cam slots are preferably configured with an overlying (radially outward) resistive detent applied to the disengaged pawls. The detent prevents undesired movement of the control ring which may otherwise occur at high speed rotation as centrifugal force acting on the drag shoes of the control ring urges the drag shoes to lift away from the fixed bearing surface. Because the centrifugal force increases as speed of rotation increases, the detent, and therefore the control ring, is increasingly resistive to rotational movement relative to the drive member and thereby counters the reduced drag force which correspondingly decreases due to the same centrifugal force acting on the drag shoes.

There are conditions when it is desirable to have both sets of pawls in the engagement position. For example, such full pawl engagement may be desirable for providing engine braking as applied to all four wheels when descending a steep grade. The configuration of the cam slot can allow such simultaneous engagement with the control ring in a mid-position and as will be described, such a mid-position can be achieved with a supplemental clutch member connecting the control ring to the driven ring. This same mid-position of the cam slot can be used to force disengagement of both pawls for uninterrupted two-wheel drive mode as will also be explained.

These additional features and other features and advantages will be more fully appreciated upon reference to the following detailed description having reference to the accompanying drawings. Further, whereas the preferred embodiment is briefly described above, the broad concept of the invention is considered to encompass the use of pawls in both rotative directions controlled by a single control member that inherently shifts the pawls between forward and rearward operational positions i.e., without driver involvement, and to provide such feature in a compact package for vehicle drive train application.

DETAILED DESCRIPTION OF THE INVENTION

Figure 1:
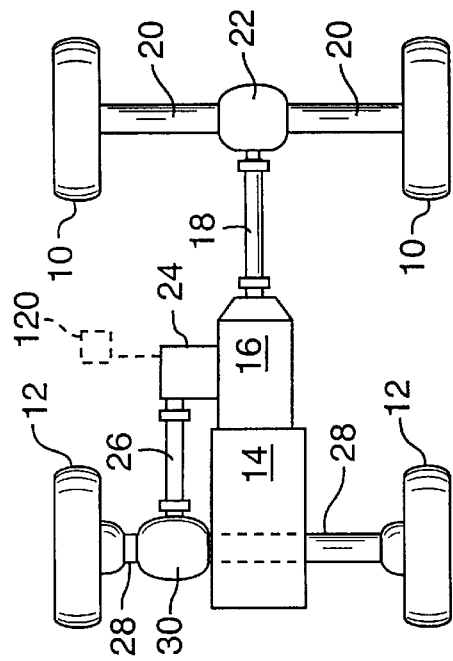
FIG. 1 is a schematic illustration of a vehicle chassis incorporating the present invention.

FIG. 1 illustrates an application for the present invention and represents a vehicle chassis. Wheels 10 represent the rear wheels of a vehicle and wheels 12 represent the front wheels. An engine 14 provides rotative power to a transmission 16 which transmits the rotative power to a propeller shaft 18 which interconnects with axles 20 though differential 22 for driving rear wheels 10.

In this example the rear wheels are permanently connected to the engine 14 and it is desirable to have the front wheels 12 also engaged with the engine when needed. Should the rear wheels be unable to provide sufficient drive power for propelling the vehicle i.e. when the rear wheels are unable to establish sufficient gripping with the underlying surface and start to slip, it is desirable to also engage the front wheels and thereby provide the additional gripping of the front wheels with the underlying surface.

Accordingly the vehicle of FIG. 1 is provided with a transfer case 24 that is connectable to the transmission 16. A front propeller shaft 26 extends from the transfer case to front wheel axles 28 through front end differential 30 and thus to the front wheels 12.

It will be appreciated that to achieve the engagement/disengagement of the front wheels to the engine, the front wheel drive train represented by the transmission, transfer case, front propeller shaft, front wheel differential and front wheel axles, requires at least one point of separation which defines a drive component and a driven component. These components are in adjacent relationship and a clutch member is actuated to interconnect the components (for engine driving also of the front wheels) or disconnect the components (for engine driving of the rear wheels only). As previously indicated and hereby repeated, the arrangement as between the front and rear wheels discussed above may be reversed, i.e., with the front wheels permanently engaged and the rear wheels in part-time engagement.

Figure 2:
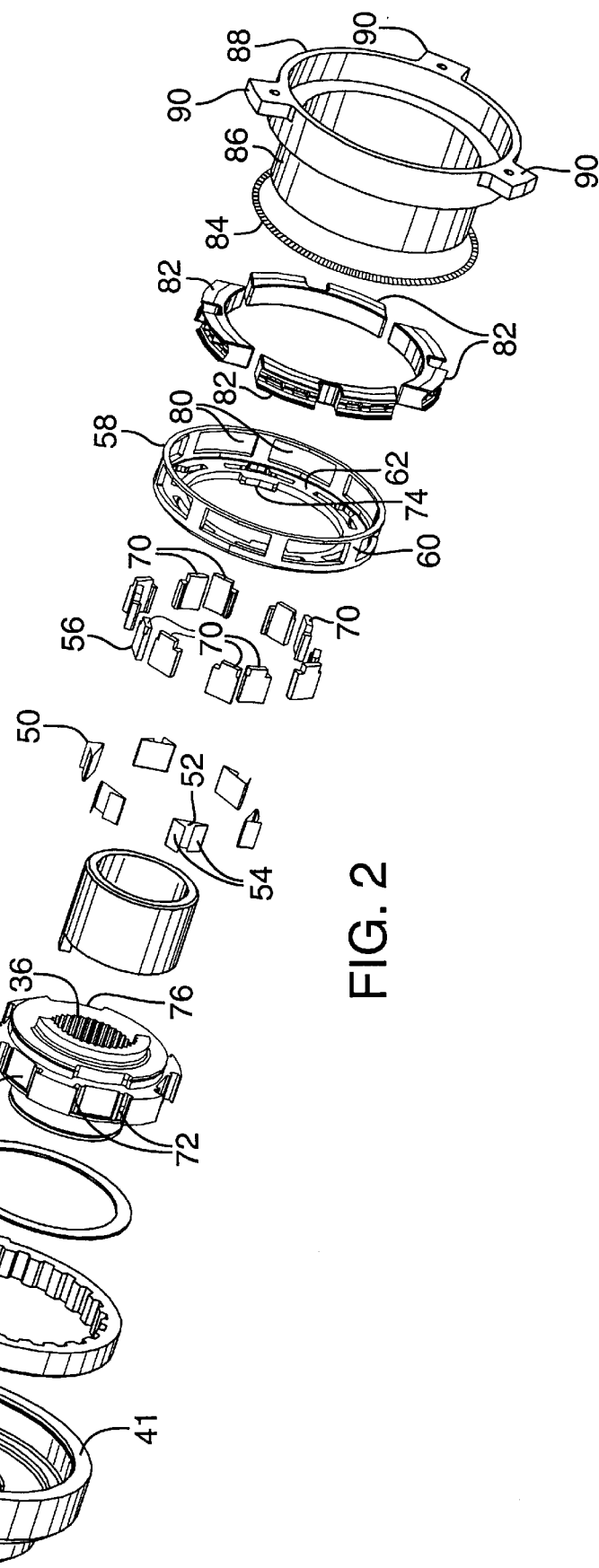
FIG. 2 is an exploded perspective view of a clutch mechanism of the present invention as incorporated in the chassis of FIG. 1.
Figure 3:
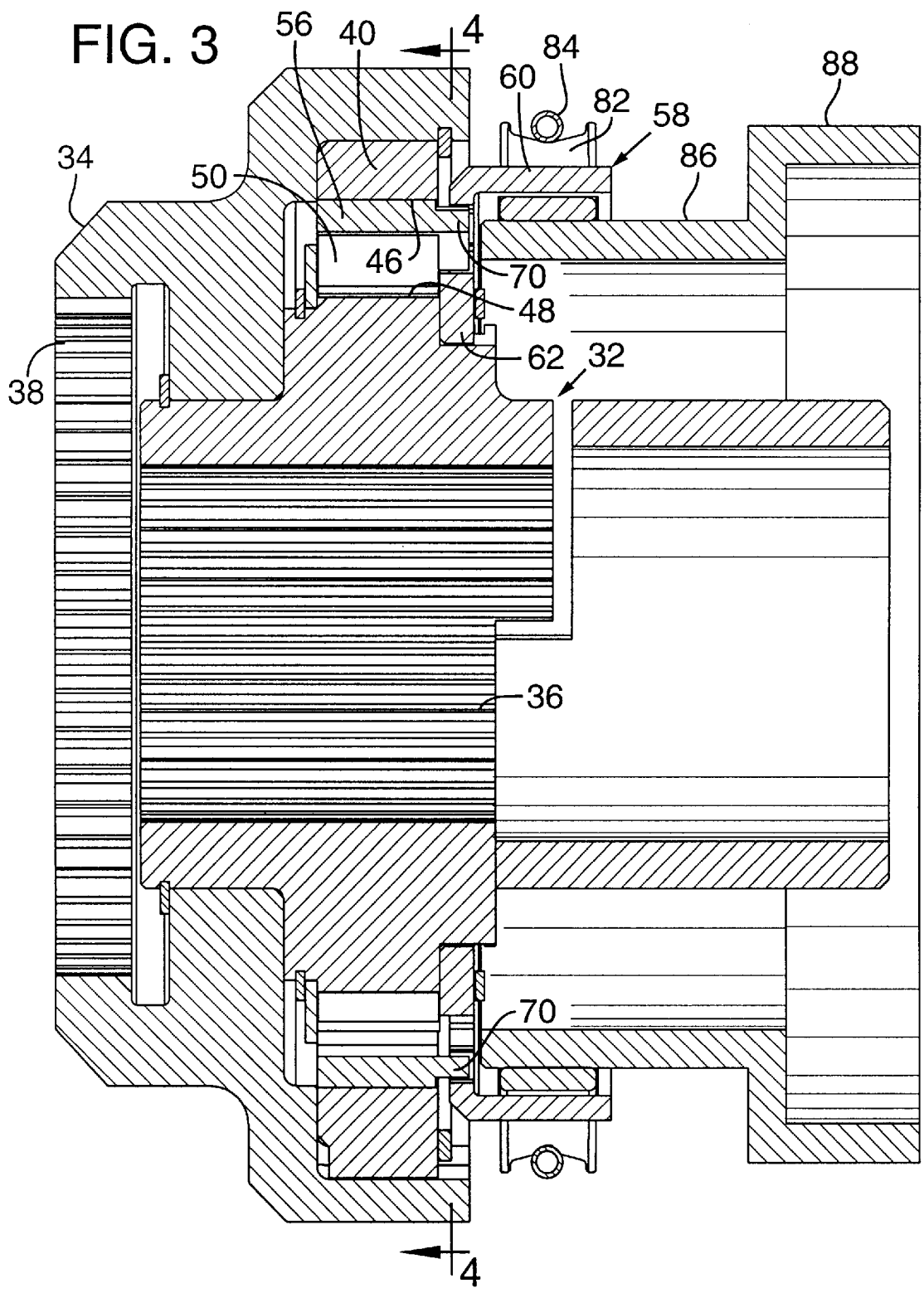
FIG. 3 is a cross sectional view of the mechanism of FIG. 2 in an assembled condition.
Figure 4:
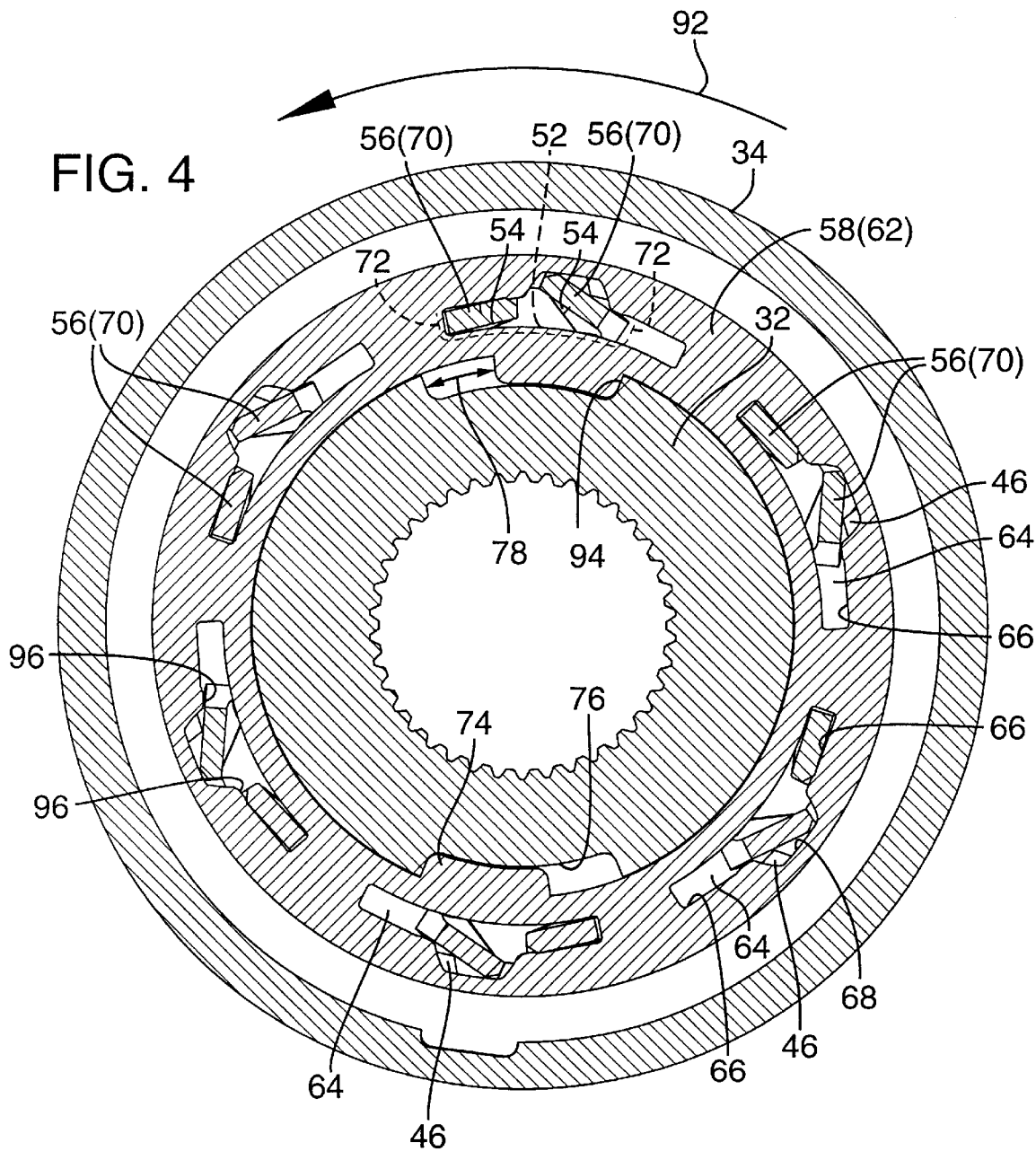
FIG. 4 is a cross sectional view as taken on view lines 4—4 of FIG. 3.

FIG. 2 is an exploded, perspective view and FIGS. 3 and 4 are sectional views of the drive and driver components and the clutch mechanism for engagement/disengagement of these components. Item 32 is the drive component and item 34 is the driven component. The clutch mechanism encompasses features of the drive and driven components as well as numerous other features illustrated in the drawings as will now be described.

For clarification purposes it will be appreciated that each of the drive and driven components are permanently connected into the drive train. In the illustrated embodiment, drive component 32 has splines 36 connected to a splined shaft (not shown) of the drive portion of the drive train and driven component 34 has splines 38 connected to a splined shaft (not shown) of a driven portion of the drive train. There are however other connection mechanisms and those skilled in the art will be well versed on such other connecting mechanisms and will readily adapt the concepts herein to such mechanisms.

The driven component 34 of the illustrated embodiment includes a cam ring 40 that is rotatably connected to a carrier 41 by key 42 engaging keyway 44 of the carrier 41. The features of the cam ring 40 may be integrally embodied in the driven component depending on the perceived benefits in manufacturing and assembly of the different parts, a criteria that governs the illustrated design in a number of respects.

The cam ring 40 of driven component 34 is provided with an inner configuration 46 that forms cavities and the drive component 32 is provided with an exterior configuration 48 that is also provided with cavities of a different shape but nevertheless mated as will become apparent. From FIG. 3 it will be seen that inner configuration 46 and exterior configuration 48 are in concentric, spaced apart, face to face relation when assembled.

Seated in the cavities of exterior configuration 48, are configured leaf springs 50. From FIG. 2, it will be noted that each leaf spring includes a base portion 52 and a pair of wing portions 54. Interposed between each wing portion 54 and the interior configuration 46 of cam ring 40 is a pawl 56 (see FIG. 4). As will be apparent there are a pair of pawls 56 for each spring 50. One of the pawls of each pair of pawls is for engagement in forward direction and the other of the pawls is for engagement in reverse direction as will be hereafter explained.

Figure 5:
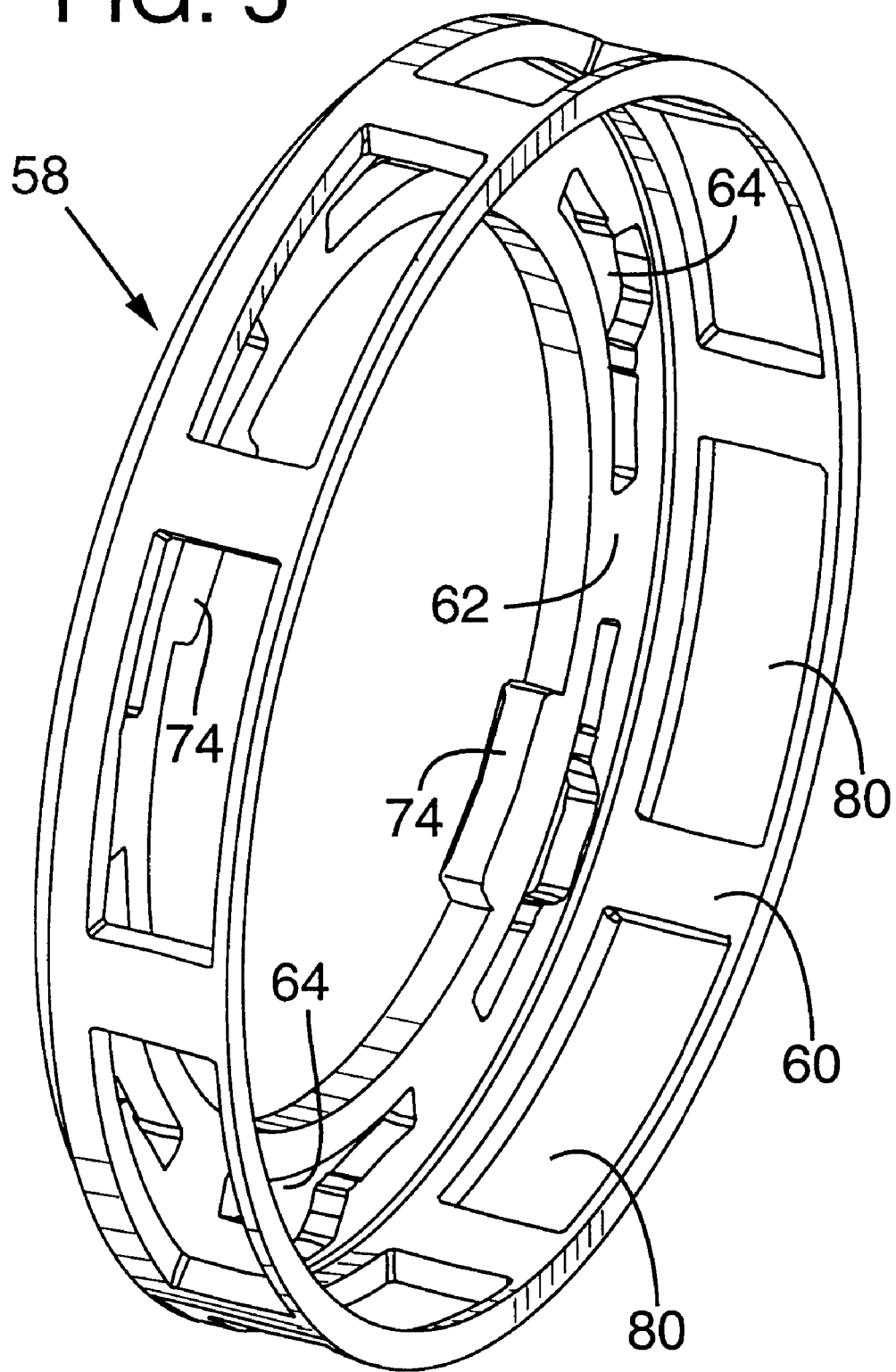
FIG. 5 is a perspective view of a control member used in the clutch mechanism of FIGS. 2 and 3.

The engagement of the pawls as generally explained above is controlled by a control member 58. An enlarged view of the control member is illustrated in FIG. 5. The control member is ring shaped including a circumferential flange 60 and a radial flange 62. As noted in FIGS. 2 and 3 the radial flange is adjacent the spacing between configurations 46,48 and adjacent the springs 50. As will also be noted, the circumferential flange 58 of the control member extends axially away from this spacing.

Returning to FIG. 5, the radial flange 62 of the control member 58 is provided with cam slots 64. The configuration of the cam slots 64 is best illustrated in FIG. 4. As illustrated the cam slots 64 is shaped to have narrow sides 66 and a widened center 68. Now return to FIG. 2 and note that each of the pawls 56 are provided with a guide or cam follower tab 70. These guide or cam follower tabs are extended into cam slots 64 as seen in FIGS. 3 and 4. As will be further noted, each slot accommodates two tabs 70, one being contained in a configured side portion 66 and the other in the widened center portion 68 of the slot. The orientation of the tabs 70 (one being confined in a side portion and the other in a center portion of the slot) is produced by movement of the control member 58 relative to the drive component 32 as will now be explained.

With reference to FIG. 2, recall that the springs 50 and pawls 56 are seated in the cavities of outer configuration 48. The cavities have shoulders 72 against which one edge of the pawl is abutted. (One pawl of each pair of pawls being directed against one of the shoulders 72 and the other pawl directed against the other of the shoulders 72). Now note that the control member 58 is free to rotate relative to drive component 32 a limited amount i.e. a boss 74 on the control member 58 projects into a depression 76 in the drive component 32. As best seen in FIG. 4., the depression 76 is wider than the boss 74 and thus the control member 58 can rotate relative to the control member by a limited degree of rotation 78.

In FIG. 4, the control member 58 is rotated to the extreme clockwise position relative to the drive component 32, i.e., the drive component being driven counter clockwise indicated by arrow 92. In this position the pawls 56 are positioned at the left side of the cam slot 64. Note the dash line in FIG. 4 indicating the position of shoulders 72 of configuration 48 relative to the cam slot 64. Also note that the guide tab 70 of the right pawl (of the pair of pawls in cam slot 64) is projected radially outward and in this position the pawl is projected into a cavity of driven component 34. The left pawl is cammed by the configuration of the slot to a retracted position. Upon relative rotation of the control member in the opposite direction, i.e. to the extreme counterclockwise position (by distance 78) the pawls are shifted to the right side of the cam slot, and then the left pawl is extended into engagement with the driven component and the right pawl is retracted out of engagement due to the restrictive configuration of the right side of the cam slot. The clockwise and counterclockwise rotation of the control member relative to the drive component is produced by a drag mechanism which will now be explained.

The circumferential flange portion 60 of control member 58 (see FIG. 5) is provided with openings 80 (eight openings 80 illustrated in FIG. 2). Now refer to FIGS. 2 and 3 and note that drag shoe segments 82 project outwardly from within flange portion 60 and through the openings 80 and, accordingly, are rotatively fixed to the control member 58. The drag shoe segments are urged inwardly toward bearing surface 86 by a garter spring 84 whereby the braking of the shoes is transmitted to the control member. The control member 58 with drag shoe segments 82 mounted thereon is positioned around a fixed bearing surface 86 of a friction ground member 88. The ground member 88 is attached to a fixed portion of a vehicle chassis as indicated by mounting ears 90.

OPERATION

As previously explained the present invention is primarily directed to drive trains of vehicles and particularly to vehicles having two wheel and four wheel drive capability with four wheel drive capability engaged only as needed. Thus when the vehicle is traveling on a dry road, the standard two wheel drive provides sufficient gripping of the road surface so that four wheel drive is not needed. Under such conditions the clutch mechanism operates substantially in a passive state although some torque is being transmitted to the front axle under most driving conditions. FIG. 4 represents a counterclockwise drive direction as indicated by arrow 92. The drive power is accordingly applied to drive component 32. The control member 58 resists rotation in this counter clockwise direction by reason of the connection of the drag shoe segments 82 with the circumferential flange 60 of control member 58, and because the drag shoe segments 82 are biased against the bearing surface 86 by garter spring 84.

The resistance to rotation of the control member 58 causes the control member to fall behind the rotation of the drive component 32 until the bosses 74 on the control member 58 become abutted against the trailing shoulder 94 of the depression 76 of the drive component. Because the drive component carries the pawls 56, the shift of the cam slots 64 is to the extreme clockwise position relative to the pawls, thereby positioning the leading pawl of each pair of pawls at the confined side of the cam slot (and thereby retraction of the leading pawl) and positioning the trailing pawl in the widened center 68 of the slot. The trailing pawl thus is biased by a wing portion 54 of spring 50 outwardly toward the driven component 34 and more specifically into a cavity of inner configuration 46.

It will be appreciated that on a dry road surface and assuming that the four wheels are appropriately matched (and further assuming for description purposes only, that the rear wheels are the drive wheels), the rear wheels being driven will provide the primary propulsion to the vehicle and the front wheels will provide only that small portion of propulsion afforded through slippage of the rear tires. To the extent that the front wheels want to travel faster than the rear wheels, a situation that typically occurs during cornering or deceleration, because the trailing pawls are angularly projected outward from the drive component 32 to the driven component 34 in the drive direction 92 (see FIG. 4), the interior configuration 46 of driven member 42 functions in the manner of a cam to simply ride over the pawls (forcing the pawls inward) and thereby avoid engagement.

Should the vehicle encounter slippery road conditions, it can happen that the rear wheels (the drive wheels) will lose gripping power and start to slip i.e. rotate faster than what is transmitted to the movement of the vehicle. The front wheels being passive will rotate only relative to the movement of the vehicle and thus the drive component 32 starts to rotate faster than the driven component 34. Now the trailing pawls 56 engage a cavity of interior configuration 46 of the driven component 32 and the front wheels are converted from passive rotating wheels to drive rotating wheels.

The operation of the control member 58 and pawls 56 in reverse direction i.e. opposite to drive direction 92, will not be described in detail in that the operation is the same as just described but with the other pawl of the pair of pawls becoming the trailing pawl. The same but opposite effect is produced by the drag shoes i.e. the control ring 58 resists rotation and shifts to the opposite side of depression 76 whereby the trailing pawls are centered in cam slots 64 and angularly projected (by spring 50) outwardly toward the interior configuration of the driven component.

Whereas the above describes the desired operation of the clutch mechanism in most typical types of road conditions, there are other conditions to consider. When the vehicle is driven at high speeds, the control member will substantially lose its resistance to rotation by reason of the drag shoe segments lifting off the bearing surface 86 due to centrifugal force. It may even be desirable for this to occur as wearing of the shoe segment is thereby reduced. When the drag resistance applied to control member 58 is abated, there is opportunity for the control member to drift forward relative to the drive component. In the preferred embodiment of the invention such drifting is avoided by providing a detent 96 in the configuration of the cam slot 64 (see FIG. 4). The detent at slow speeds provides very little resistance to the sliding of guide tab 70 (of pawl 56) from a configured side slot portion toward the widened center portion of slot 64. However, at high speeds the same centrifugal force that produces lifting of the drag shoe segments also induces lifting of the pawls and the detent then becomes a significant deterrent to rotational movement of the control plate. It will be appreciated that the two resistive forces are inversely related so that the garter spring force as compared to the detent force is sufficiently greater at a slow speed to insure shifting of the control member 58 to a trailing position when the direction of drive is reversed.

Figure 9:
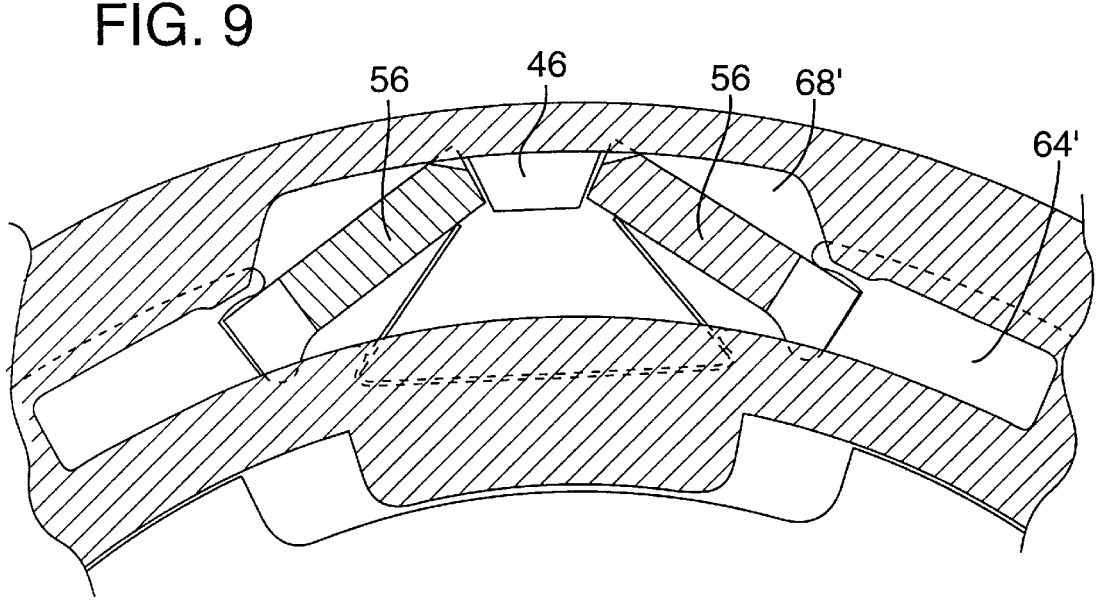
FIG. 9 illustrates a function performed by the mechanisms of FIGS. 6–8.
Figure 10:
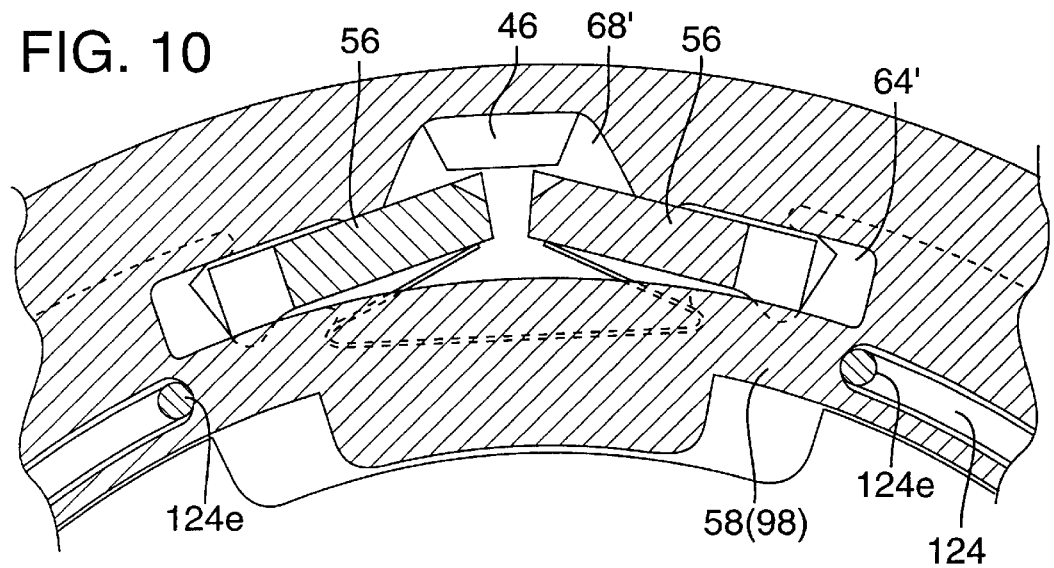
FIG. 10 illustrates an alternative function to that of FIG. 9 and also an alternative shift mechanism to that of FIGS. 6–8.

The present invention contemplates also a need for selectively eliminating the clutch operation. For example, a vehicle descending a steep grade will desirably provide engine braking, i.e., whereby the engine provides a drag on the driven wheels as the vehicle attempts to travel by gravity influence faster than the engine speed. It is desirable under such circumstances that all four wheels are rotatably fixed to the engine in both directions of rotation. This can occur if both pawls 56 of each pawl set are projected into the cavity configuration 46 of the driven component 34 thereby providing engagement whenever either component overruns the other. The control member will provide such projection of both pawls if the center position 68 of cam slot 64 is sufficiently long so that a center position of pawls will allow both pawls to project outwardly, e.g., as illustrated in FIG. 9. An alternative version of desired clutch elimination is achieved when the center portion 68 is shortened. In this case, both pawls will be depressed as illustrated in FIG. 10 and then the vehicle will function in two-wheel drive only. In either version, the pawl positions are centered relative to the cam slot 64 by center positioning and affixing the position of the control member 58 relative to the drive component 32. Such mechanism is described with reference to FIGS. 6–8.

Figure 6:
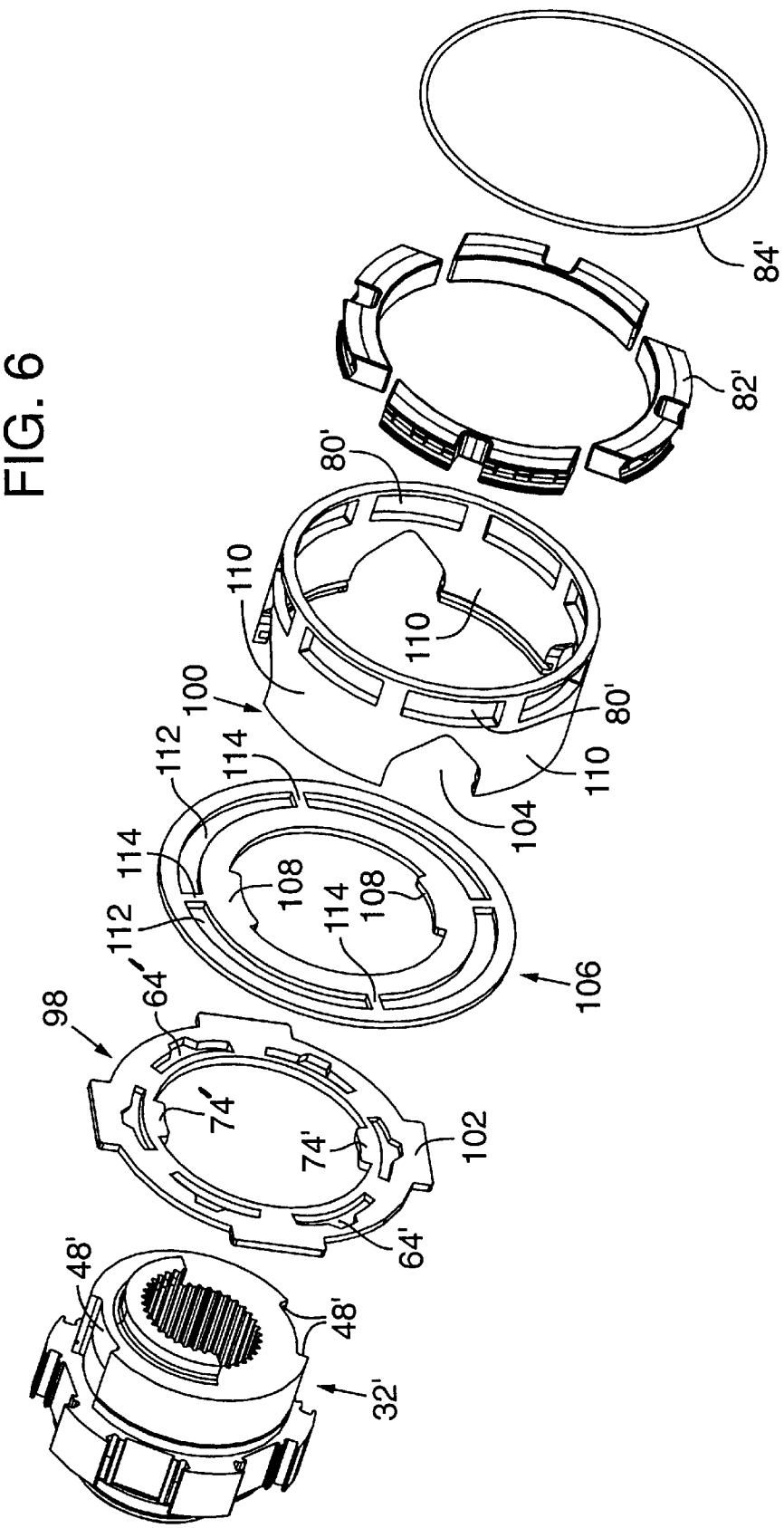
FIG. 6 is an exploded perspective view of an alternative clutch mechanism similar to that of FIG. 2 but including a feature wherein the clutch mechanism is shiftable to a fixed full-time engagement mode of operation (or fixed non-engagement mode of operation)

The components that interact to neutralize the clutch mechanism are shown in FIG. 6. Drive component 32' is essentially unchanged from that shown in FIG. 2 as is the brake shoe segment 82' and garter spring 84'. The control member of FIG. 6 (performing the function of control member 58 of FIG. 2) is in two portions identified as portions 98, 100. The control member portion 98 includes the cam slot 64' and boss portions 74' having functions similar to cam slot 64 and boss 74 of control member 58 in FIG. 2. Control member portion 100 has openings 80' which receive brake shoe segments 82', again like the control member 58 of FIG. 2. The two control member portions 98 and 100 are keyed together by lugs 102 of control member portion 98 fitting the mouth of V groove 104.

The functional difference is provided by a centering ring 106 interposed between the two control member portions 98 and 100. Boss portions 108 of centering ring 106 snugly fit the depressions of exterior configuration 48' of drive component 32' and thus the centering ring 106 is fixed rotatably but not axially relative to drive component 32'. The circumferential wall segments 110 of control member portion 100 fit through annular slots 112 of centering ring 106 with web segments 114 positioned in V grooves 104. As will be noted, the web segments 114 have substantial clearance when positioned near the mouths of V grooves 104 and when positioned inwardly toward the apex of the grooves, they are confined to the center of the groove.

Figure 8:
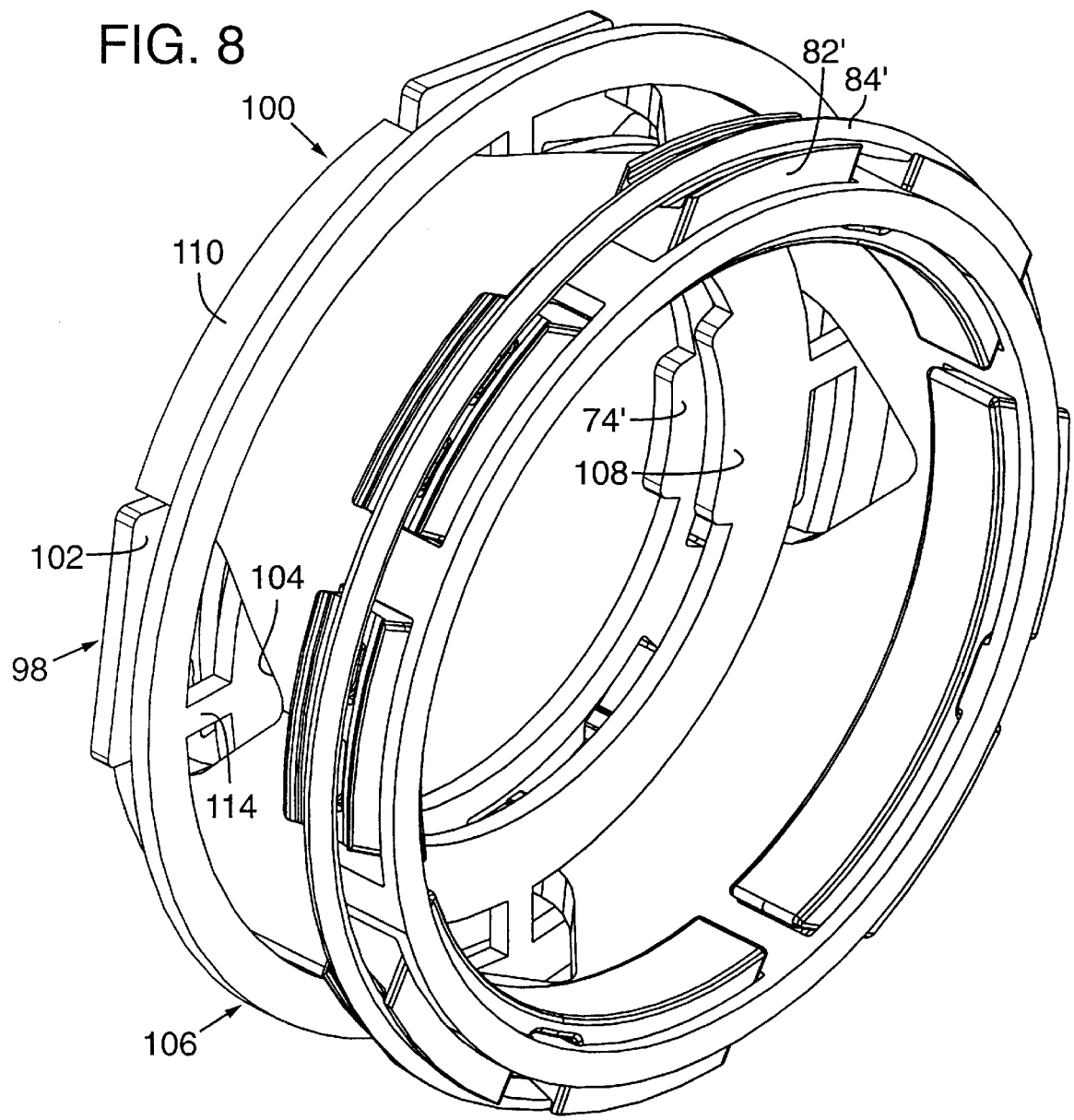
FIG. 8 is a perspective view illustrating the control components of the clutch mechanism of FIG. 7.

The interfit between the control member portions 98, 100 (including the brake shoes 82' and garter ring 84') and the centering ring 106 will be observed in FIG. 8. It will be appreciated from FIGS. 6 and 8 that the centering ring when positioned at the mouth of the V groove 104 does not interfere with the clutch mechanism. The control member 98, 100 (in combination) has limited rotative movement relative to drive component 32' by reason of boss portion 74' being undersized relative to depression 48'. Whereas boss 108 of centering ring 106 fills the depression 48' and therefore locks the centering ring 106 rotatably to the drive component 32', the centering ring 106 is free to rotate relative to the control ring as long as web 114 of the centering ring is located at the mouth of the V groove 104.

Upon axial movement of the centering ring 106 toward the apex of V groove 104, the web 114 contacts one of the sides of the groove 104 (like a cam action) and forces the relative rotation of the centering ring and control member 98, 100 until the web 114 is located in the apex. At this position the centering ring 106 and the control member 98, 100 are interlocked rotatably. Accordingly, the drive component and the control ring are interlocked rotatably. By designing this interlock position to provide for centering of the pawls 56 in the cam slot 64' as illustrated in FIG. 9 and 10, the pawls are thereby locked in the center position to either lock the drive and driven components against overrunning by either component for full-time four-wheel drive (as viewed in FIG. 9) or unlock the drive and driven components and thus provide two-wheel drive (as viewed in FIG. 10).

Figure 7:
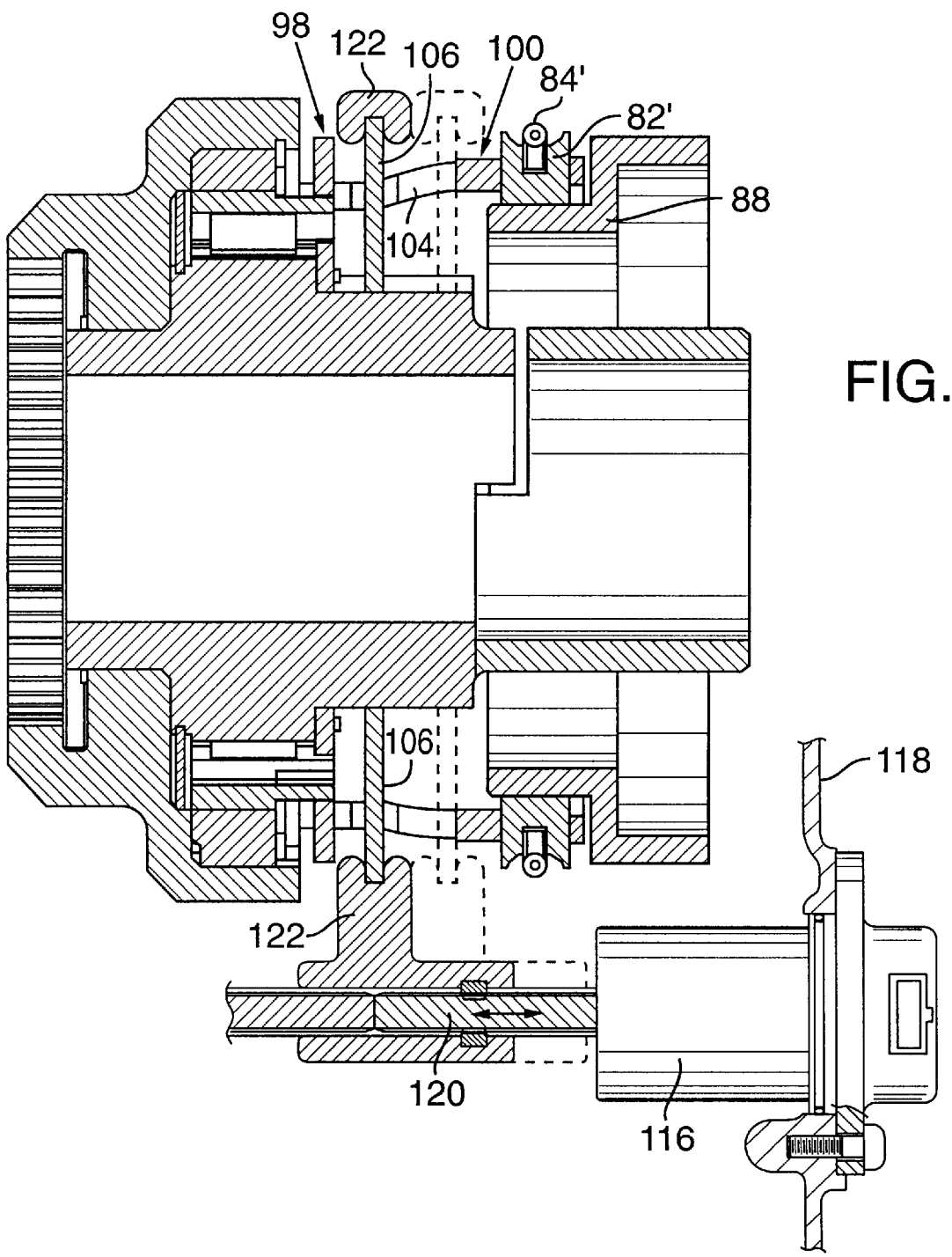
FIG. 7 is a view of the clutch mechanism of FIG. 6 assembled and further illustrating a shift mechanism.

Movement of the centering ring as between the mouth and apex of the V groove 104 is controlled by an actuator 116 mounted on housing 118 as viewed in FIG. 7. The actuator moves a piston 120 back and forth (left and right as seen in FIG. 7). A saddle ring 122 is fixed to the piston 120 and the centering ring 106 is held in the saddle ring 122 as shown. The centering ring is shown in solid lines at the clutch operating position, i.e., with the web segments 114 positioned in the mouth of V groove 104, and in dash lines in the clutch neutralized position, i.e., with the web segment 114 in the apex of the V groove 104. Actuator 116 is selectively actuated manually by the vehicle operator or by a computer which are schematically illustrated collectively in FIG. 1 by reference 120. No new disclosure is added by this amendment as the disclosure is contained in original claims 10 and 11.

An alternative to the actuator and centering ring of FIGS. 6–8 is a centering spring illustrated in FIG. 10. The centering spring 124 is further disclosed in the commonly owned parent application identified above. The centering ring is anchored to the drive component (not shown in FIG. 10 but shown in the parent application) and the ends 124E of the spring 124 bias the control member 58 (98) to the center position. In this alternative design, it is desirable to remove the urging force of the friction shoes which can be accomplished by providing the ground member 88 of FIG. 2 to be selectively rotatable, i.e., with the ground member being releasably lockable to the housing. The ground member is normally locked except when the clutch mechanism is to be neutralized. A rotatable but lockable ground member is illustrated in commonly owned U.S. patent application Ser. No. 08/721,822.

The above described embodiments are set forth herein as preferred examples of the invention and those skilled in the art will conceive of numerous variations without departing from the true intent and scope of the invention. Accordingly, the invention is not limited to these preferred embodiments and instead is encompassed by the definition of the claims appended hereto.

I claim:

1. A clutch mechanism for a vehicle drive train having a rotatable drive component and a rotatable driven component independently rotatable relative to each other and both being rotatable in either direction of rotation, said clutch mechanism comprising:

a first member provided as the drive component and a second member provided as the driven component, said first and second members having adjacent faces in fixed relationship when the drive and driven components are rotating in unison, a first and second set of mated shoulders in each of the faces, and first and second sets of pawls positioned between said faces, said first set of pawls shiftable between positions of engagement and disengagement with both first sets of shoulders for locking and unlocking engagement of the first and second members in one direction of rotation, and said second set of pawls shiftable between positions of engagement and disengagement with both second sets of shoulders for locking and unlocking engagement of the first and second members in the other direction of rotation; and a biasing feature of said clutch mechanism biasing said pawls into engagement position and a control member shiftable between first and second rotatable positions relative to said pawls and acting on said pawls to force retraction of the first set of pawls to out-of-engagement position in the first position and to force retraction of the second set of pawls to out-of-engagement position in the second position, and a rotational retarding feature provided for friction retarding of the rotational movement of said control member whereby rotation of the first and second members in one direction with the control member being retarded in its rotation in said one direction shifts the control member to the first position, and the rotation of the first and second members in the other direction with the control member retarded in said other direction shifts the control member to the second position.

2. A clutch mechanism as defined in claim 1 wherein said control member is positionable at a third position permitting engagement of both sets of pawls in either direction of rotation, and an actuator connected to said control member and selectively actuated by a driver of a vehicle to position said control member at said third position.

3. A clutch mechanism for a vehicle drive train having a rotatable drive component and a rotatable driven component independently rotatable relative to each other and both being rotatable in either direction of rotation, said clutch mechanism comprising:

a first member provided as the drive component and a second member provided as the driven component, said first and second members having adjacent faces in fixed relationship when the drive and driven components are rotating in unison, a first and second set of mated shoulders in each of the faces, and first and second sets of pawls positioned between said faces, said first set of pawls shiftable between positions of engagement and disengagement with both first sets of shoulders for locking and unlocking engagement of the first and second members in one direction of rotation, and said second set of pawls shiftable between positions of engagement and disengagement with both second sets of shoulders for locking and unlocking engagement of the first and second members in the other direction of rotation;

a biasing feature of said clutch mechanism biasing said pawls into engagement position and a control member shiftable between first and second positions and acting on said pawls to force retraction of the first set of pawls to out-of-engagement position in the first position and to force retraction of the second set of pawls to out-of-engagement position in the second position, and a rotational retarding feature provided for retarding rotational movement of said control member whereby rotation of the first and second members in one direction with the control member being retarded in its rotation in said one direction shifts the control member to the first position, and the rotation of the first and second members in the other direction with the control member retarded in said other direction shifts the control member to the second position; and said pawls provided with cam follower tabs, said control member having camming slots through which the cam follower tabs are projected, said camming slots configured to permit engagement of the pawls and to depress the pawls into disengagement depending on the position of the control member relative to the pawls.

4. A clutch mechanism as defined in claim 3 wherein said configured slots have a detent with the pawls engaging the detent in the depressed non-engaging position for resisting relative movement of the pawls and control member during rotation.

5. A clutch mechanism for a vehicle drive train having a rotatable drive component and a rotatable driven component independently rotatable relative to each other and both being rotatable in either direction of rotation, said clutch mechanism comprising:

a first member provided as the drive component and a second member provided as the driven component, said first and second members having adjacent faces in fixed relationship when the drive and driven components are rotating in unison, a first and second set of mated shoulders in each of the faces, and first and second sets of pawls positioned between said faces, said first set of pawls shiftable between positions of engagement and disengagement with both first sets of shoulders for locking and unlocking engagement of the first and second members in one direction of rotation, and said second set of pawls shiftable between positions of engagement and disengagement with both second sets of shoulders for locking and unlocking engagement of the first and second members in the other direction of rotation;

a biasing feature of said clutch mechanism biasing said pawls into engagement position and a control member shiftable between first and second positions and acting on said pawls to force retraction of the first set of pawls to out-of-engagement position in the first position and to force retraction of the second set of pawls to out-of-engagement position in the second position, and a rotational retarding feature provided for retarding rotational movement of said control member whereby rotation of the first and second members in one direction with the control member being retarded in its rotation in said one direction shifts the control member to the first position, and the rotation of the first and second members in the other direction with the control member retarded in said other direction shifts the control member to the second position; and said faces are peripheral faces of overlying ring members and positioned in concentric relationship, said pawls are biased in part to an engaging position by centrifugal force, and wherein the rotational retarding feature is provided by the control member having frictional engagement to ground including drag shoes provided on the control member which are biased toward a bearing surface, said drag shoes biased in part away from frictional engagement by centrifugal force whereby as the centrifugal force increases for both the pawls and the brake shoes, resistance to movement by the brake shoes diminishes and the resistance to movement by the detent increases.

6. A clutch mechanism for a vehicle drive train having a rotatable drive component and a rotatable driven component independently rotatable relative to each other and both being rotatable in either direction of rotation, said clutch mechanism comprising:

a first member provided as the drive component and a second member provided as the driven component, said first and second members having adjacent faces in fixed relationship when the drive and driven components are rotating in unison, a first and second set of mated shoulders in each of the faces, and first and second sets of pawls positioned between said faces, said first set of pawls shiftable between positions of engagement and disengagement with both first sets of shoulders for locking and unlocking engagement of the first and second members in one direction of rotation, and said second set of pawls shiftable between positions of engagement and disengagement with both second sets of shoulders for locking and unlocking engagement of the first and second members in the other direction of rotation;

a biasing feature of said clutch mechanism biasing said pawls into engagement position and a control member shiftable between first and second positions and acting on said pawls to force retraction of the first set of pawls to out-of-engagement position in the first position and to force retraction of the second set of pawls to out-of-engagement position in the second position, and a rotational retarding feature provided for retarding rotational movement of said control member whereby rotation of the first and second members in one direction with the control member being retarded in its rotation in said one direction shifts the control member to the first position, and the rotation of the first and second members in the other direction with the control member retarded in said other direction shifts the control member to the second position; and said faces are peripheral faces of overlying ring members and positioned in concentric relationship, and said pawls are urged toward an engaging position by centrifugal force.

7. A clutch mechanism as defined in claim 1 wherein said control member is positionable at a third position prohibiting engagement of both sets of pawls in either direction of rotation, and an actuator connected to said control member and selectively actuated to position said control member at said third position.

8. A clutch mechanism as defined in claim 1 wherein the rotational retarding feature is provided by the control member having frictional engagement to ground including drag shoes provided on the control member which are biased toward a bearing surface that is fixed or rotating slower than the first member, said control member having limited rotation relative to the first member and in either direction of rotation is shifted to a trailing position which defines the first and second positions of the control member.

9. A control member as defined in claim 8 wherein said pawls are provided with cam follower tabs, said control member having camming slots through which the cam follower tabs are projected, said camming slots configured to permit engagement of the pawls and to depress the pawls into disengagement depending on the position of the control member, and said configured slots having overlying detents positioned so that the pawls engage the detent in the depressed non-engaging position, said detents resisting relative movement of the pawls and control member during high speed rotation;

said drag shoes urged by a biasing force toward said bearing surface, said biasing force and said resistive force provided by the detent acting on the pawls being inversely affected by centrifugal force whereby a start up rate of rotation of the first member insures the shifting of the control member to a trailing position.

10. A clutch mechanism as defined in claim 7 wherein the actuator is selectively actuated by a driver of a vehicle.

11. A clutch mechanism as defined in claim 7 wherein the actuator is actuated by a computer.

* * * * *